US009375677B2

(12) United States Patent
Karode

(10) Patent No.: US 9,375,677 B2
(45) Date of Patent: Jun. 28, 2016

(54) HELIUM RECOVERY FROM NATURAL GAS

(71) Applicant: Air Liquide Advanced Technologies U.S. LLC, Houston, TX (US)

(72) Inventor: Sandeep K. Karode, Boothwyn, PA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 370 days.

(21) Appl. No.: 14/137,815

(22) Filed: Dec. 20, 2013

(65) Prior Publication Data

US 2014/0243574 A1  Aug. 28, 2014

Related U.S. Application Data

(60) Provisional application No. 61/769,366, filed on Feb. 26, 2013.

(51) Int. Cl.
 *C07C 7/144* (2006.01)
 *B01D 53/02* (2006.01)
 *B01D 53/22* (2006.01)
 (Continued)

(52) U.S. Cl.
 CPC ............. *B01D 53/226* (2013.01); *B01D 53/22* (2013.01); *C01B 23/0047* (2013.01); *C10L 3/101* (2013.01); *E21B 43/26* (2013.01); *B01D 2257/11* (2013.01); *C01B 2210/007* (2013.01);
 (Continued)

(58) Field of Classification Search
 CPC ......... C07C 7/144; B01D 53/02; B01D 53/22
 USPC ................................... 585/818, 802; 95/143
 See application file for complete search history.

(56) References Cited

U.S. PATENT DOCUMENTS

2004/0134794 A1  7/2004  Sundaram et al.
2014/0345457 A1*  11/2014  Balster ................ B01D 53/225
 95/53

FOREIGN PATENT DOCUMENTS

RU      114423 U1   3/2012
WO  2009087520 A1   7/2009
 (Continued)

OTHER PUBLICATIONS

Agrawal, et al.; "Gas Separation Membrane Cascades II. Two-Compressor Cascades"; Elsevier, Journal of Membrane Science, vol. 112, No. 2, pp. 129-146 (18); Apr. 17, 1986.
 (Continued)

*Primary Examiner* — Thuan D Dang
(74) *Attorney, Agent, or Firm* — Christopher J. Cronin

(57) ABSTRACT

Helium-containing natural gas is processed with three gas separation stages to produce a natural gas product and a Helium-containing gas that may be injected into the reservoir from which the Helium-containing natural gas is obtained. A permeate from the first gas separation membrane stage is compressed and fed to the second gas membrane stage. The permeate from the second gas separation membrane stage is recovered as the Helium-containing gas that may be injected into the reservoir. The non-permeate from the second gas separation membrane stage is fed to the third gas separation membrane stage. Non-permeates from the first and third gas separation stages are combined to produce a natural gas product. A permeate from the third gas separation membrane stage is combined with a non-permeate from the first gas separation membrane stage before it is compressed and fed to the second gas separation membrane stage.

5 Claims, 1 Drawing Sheet

(51) Int. Cl.
    *E21B 43/26*    (2006.01)
    *C10L 3/10*     (2006.01)
    *C01B 23/00*    (2006.01)

(52) U.S. Cl.
    CPC ..... *C01B2210/0031* (2013.01); *C10L 2290/46* (2013.01); *C10L 2290/548* (2013.01)

(56) References Cited

FOREIGN PATENT DOCUMENTS

| | | |
|---|---|---|
| WO | 2012050816 A2 | 4/2012 |
| WO | 2012067545 A1 | 5/2012 |

OTHER PUBLICATIONS

Hao, J., et al.; "Upgrading Low-Quality Natural Gas With H2S- and CO2-Selective Polymer Membranes Part II. Process Design, Economics, and Sensitivity Study of Membrane Stages With Recycle Streams"; Elsevier, Journal of Membrane Science, vol. 320, No. 1-2, pp. 108-122; Jul. 15, 2008.

Seok, Damon R., et al.; "Separation of Helium and Hydrocarbon Mixtures by a Two-Membrane Column"; Elsevier, Journal of Membrane Science, vol. 27, No. 1, pp. 1-11; May 1986.

Toshinori, T., et al.; "Permeators and Continuous Membrane Columns With Retentate Recycle"; Elsevier, Journal of Membrane Science, vol. 98, No. 1-2, pp. 57-67; Jan. 13, 1985.

* cited by examiner

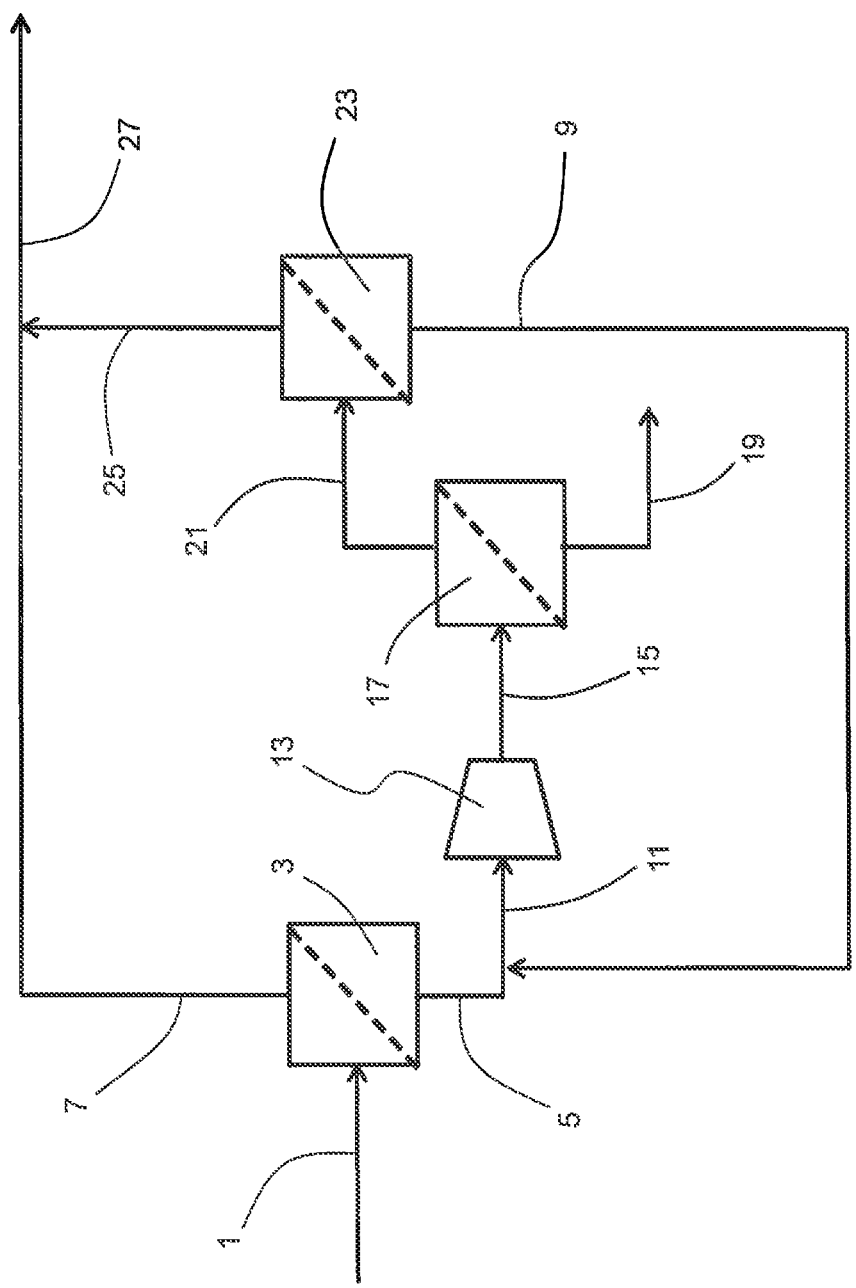

HELIUM RECOVERY FROM NATURAL GAS

CROSS-REFERENCE TO RELATED APPLICATIONS

This application claims the benefit of priority under 35 U.S.C. §119 (a) and (b) to U.S. patent application No. 61/769,366, filed Feb. 26, 2013, the entire contents of which are incorporated herein by reference.

BACKGROUND

1. Field of the Invention

The present invention relates to membrane separation of helium from natural gas.

2. Related Art

The only source of Helium is from natural gas. Helium is typically present in natural gas at below 0.5 mol % levels and is mostly extracted as crude Helium across liquid natural gas (LNG) trains. This crude Helium, containing about 20-30 mol % Helium, is then enriched either by cryogenic distillation or via a PSA to make 99.9999 mol % Helium.

Small gas molecules such as Helium are well known to be more permeable through glassy polymer membranes than methane or $N_2$. Hence, membranes can be considered for Helium recovery from natural gas. However, Helium is typically found in very low concentrations and it is difficult for a single stage membrane to achieve commercially viable levels of recovery and/or selectivity.

In general, recovery of dilute components by membranes requires multiple stages in order to achieve high purity. Other mass transfer operations, such as distillation can produce high purities by means of multiple stages. Unfortunately, membrane processes are expensive to stage since each additional stage involves permeate recompression with the attendant operating and capital costs of the compressor.

Methods of optimally staging membrane processes have been extensively studied in the academic literature. Examples of this work include Agarwal, et al., ("Gas separation membrane cascades II. Two-compressor cascades", Journal of Membrane Science 112 (1996) 129-146) and Hao 2008 ("Upgrading low-quality natural gas with $H_2S$- and $CO_2$-selective polymer membranes Part II. Process design, economics, and sensitivity study of membrane stages with recycle streams", Journal of Membrane Science 320 (2008) 108-122).

Staged membrane operations are also practiced commercially. An example is the well-known 2-stage process described by WO 12050816 A2. In this scheme, permeate from a first membrane stage (or from a section of a first membrane stage) of is re-compressed and processed by a second membrane stage. The second stage permeate is achieved at higher fast gas purity. The second stage residue is recycled to the first stage membrane feed.

Permeate refluxing is described in some versions of membrane column work by Tsuru, et al. ("Permeators and continuous membrane columns with retentate recycle", Journal of Membrane Science 98 (1995) 57-67). In this context, permeate refluxing is practiced on a single membrane stage with refluxing of a fraction of the permeate, then re-compressing that fraction and recycling it to either the feed gas or as a sweep gas. This permeate refluxing scheme is not appropriate for handling a high volume gas as the membrane area required for combined high purity and high recovery is very high.

It is an object of the invention to provide a method for separation of helium from natural gas using membranes that achieves a satisfactorily high helium recovery while attaining a minimum heating value in the purified natural gas without requiring multiple compressors.

SUMMARY

There is disclosed a method of separating natural gas and Helium from a gas mixture. The method comprises the following steps. A Helium-containing natural gas is separated at a first gas separation membrane into a first permeate and a first non-permeate. The first permeate is compressed to provide a compressed first permeate. The compressed first permeate is separated at a second gas separation membrane into a second permeate and a second non-permeate. The second non-permeate is separated at a third gas separation membrane into a third permeate and a third non-permeate, wherein the Helium preferentially permeating over the natural gas at the first, second and third gas separation membranes. The first and third non-permeates are combined to provide a product natural gas stream. The first and third permeates are combined upstream of the compressor.

The method may include any one or more of the following aspects.
- the second permeate is injected into a natural gas reservoir from which the feed gas is ultimately obtained.
- Helium is present in the Helium-containing natural gas at a concentration of less than 0.5 mol %.
- a stream of the second permeate has a mass flow rate of no more than 3% of a mass flow rate of a stream of the Helium-containing natural gas separated at the first gas separation membrane.
- the second permeate stream is purified to provide a Helium product gas having a Helium concentration of at least 99 mol %.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is an elevation schematic view of the method and system for separating Helium from natural gas using three gas separation membrane stages.

DESCRIPTION OF PREFERRED EMBODIMENTS

As best illustrated by the FIGURE, a feed gas stream 1 is fed to a first gas separation membrane 3. The feed gas stream 1 is ultimately obtained from a natural gas reservoir that also contains Helium. By "ultimately obtained", I mean that the raw natural gas extracted from the reservoir may be processed to remove one or more contaminants to render it more suitable for processing in the first gas separation membrane 3. While the feed gas stream 1 may contain a higher concentration of Helium, it typically comprises no more than about 0.5 mol % Helium. The balance of the feed gas 1 is predominantly made up of hydrocarbons with the large majority being methane. While the method of the invention may be performed using a feed gas 1 within a relatively wide range of pressures, typically it is at 30-100 bar. Similarly, while the feed gas 1 may be within a relative wide range of temperatures, typically it is at about 50° C.

The first gas separation membrane 3 separates the feed gas 1 into a first permeate stream 5 and a first non-permeate stream 7. The first permeate stream 5 is combined with a third permeate stream 9 upstream of an inlet side of a compressor 13. In this manner, the combined flow 11 is compressed by the compressor 13 and the compressed flow 15 is fed to a second gas separation membrane 17. The second gas separation membrane 17 separates the compressed flow 15 into a second permeate stream 19 and a second non-permeate stream 21. The second non-permeate stream 21 is fed to a third gas separation membrane 23 which separates it into the third permeate stream 9 and a third non-permeate stream 25.

The second permeate stream 19 contains Helium at concentrations many times higher than that of the feed gas 1. Typically, it contains around 30 mol % Helium. The second permeate stream 19 may be further purified to provide product Helium at high purity according to any of the well-known techniques for purification of Helium from natural gas. Preferably, the second permeate stream 19 is instead injected back into the reservoir. In this manner, excess Helium in the raw natural gas extracted from the reservoir need not be processed, separately stored, or used immediately. Rather, the Helium may be stored indefinitely until there is a demand for purified Helium.

The first and third non-permeate streams 7, 25 are combined to provide a product natural gas stream 27. The product natural gas stream 27 may be introduced into a natural gas pipeline, liquefied, and/or additionally processed to remove one or more contaminants. The product natural gas stream 27 typically is of pipeline grade and contains 97% or more of hydrocarbons.

Suitable materials for use in the separating layer of the gas separation membranes 3, 17, 23 preferentially permeate Helium over the non-Helium constituents of natural gas. Such membranes can be configured in a variety of ways, such as a sheet, tube, or hollow fiber. One of ordinary skill in the art will recognize that the permeate "side" of a membrane does not necessarily mean one and only one side of a membrane. Rather, in the case of membranes made up of a plurality of hollow fibers, the permeate "side" actually is considered to be the plurality of sides of the individual hollow fibers that are opposite to the sides to which the relevant feed gas is introduced. Preferably, each of the gas separation membranes 3, 17, 23 is made up of a plurality of hollow fibers. Typically, the membrane is made of a polymeric material such as a polysulfone, a polyether sulfone, a polyimide, a polyaramide, a polyamide-imide, and blends thereof. Particularly suitable polymeric materials for use in the gas separation membranes 3, 17, 23 are described in WO 2009/087520.

One of the polymeric materials described by WO 2009/087520 and which is useful for practice with the invention is a polyimide containing the repeating units shown in the following formula (I):

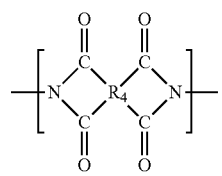
(I)

in which $R_1$ of formula (I) is a moiety having a composition selected from the group consisting of formula (A), formula (B), formula (C), and mixtures thereof, and

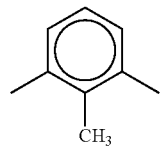
(A)

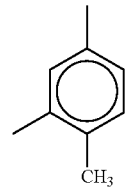
(B)

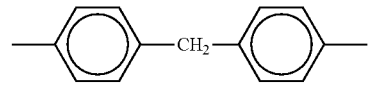
(C)

in which $R_4$ of formula (I) is a moiety having a composition selected from the group consisting of formula (Q), formula (S), formula (T) and mixtures thereof,

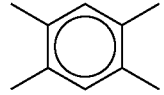
(Q)

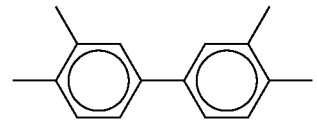
(S)

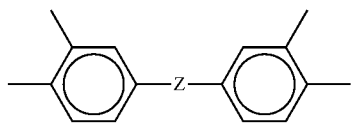
(T)

in which Z of formula (T) is a moiety selected from the group consisting of formula (L), formula (M), formula (N) and mixtures thereof.

(L)

(M)

(N)

In one preferred embodiment, the polyimide component of the blend that forms the selective layer of the membrane has repeating units as shown in the following formula (Ia):

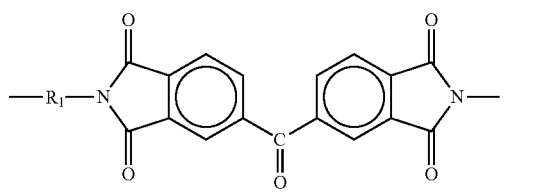

(Ia)

In this embodiment, moiety $R_1$ of formula (Ia) is of formula (A) in 0-100% of the repeating units, of formula (B) in 0-100% of the repeating units, and of formula (C) in a complementary amount totaling 100% of the repeating units. A polymer of this structure is available from HP Polymer GmbH under the trade name P84. P84 is believed to have repeating units according to formula (Ia) in which $R_1$ is formula (A) in about 16% of the repeating units, formula (B) in about 64% of the repeating units and formula (C) in about 20% of the repeating units. P84 is believed to be derived from the condensation reaction of benzophenone tetracarboxylic dianhydride (BTDA, 100 mole %), with a mixture of 2,4-toluene diisocyanate (2,4-TDI, 64 mole %), 2,6-toluene diisocyanate (2,6-TDI, 16 mole %) and 4,4'-methylene-bis (phenylisocyanate) (MDI, 20 mole %).

The polyimide (that is preferably formed in a known way to provide an outer selective layer) comprises repeating units of formula (Ib):

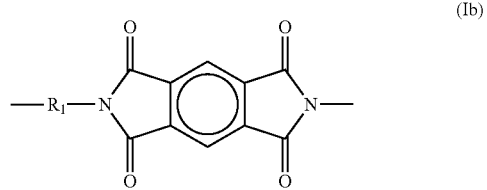

(Ib)

In one preferred embodiment, the polyimide is of formula (Ib) and $R_1$ of formula (Ib) is a composition of formula (A) in about 0-100% of the repeating units, and of formula (B) in a complementary amount totaling 100% of the repeating units.

In yet another embodiment, the polyimide is a copolymer comprising repeating units of both formula (Ia) and (Ib) in which units of formula (Ib) constitute about 1-99% of the total repeating units of formulas (Ia) and (Ib). A polymer of this structure is available from HP Polymer GmbH under the trade name P84HT. P84HT is believed to have repeating units according to formulas (Ia) and (Ib) in which the moiety $R_1$ is a composition of formula (A) in about 20% of the repeating units and of formula (B) in about 80% of the repeating units, and, in which repeating units of formula (Ib) constitute about 40% of the total of repeating units of formulas (Ia) and (Ib). P84HT is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of separating natural gas and Helium from a gas mixture, comprising the steps of:
    separating Helium-containing natural gas at a first gas separation membrane into a first permeate and a first non-permeate, the Helium preferentially permeating over the natural gas at the first gas separation membrane;
    compressing the first permeate to provide a compressed first permeate;
    separating the compressed first permeate at a second gas separation membrane into a second permeate and a second non-permeate, the Helium preferentially permeating over the natural gas at the second gas separation membrane;
    separating the second non-permeate at a third gas separation membrane into a third permeate and a third non-permeate, the Helium preferentially permeating over the natural gas at the third gas separation membrane;
    combining the first and third non-permeates to provide a product natural gas stream; and
    combining the first and third permeates upstream of the compressor.

2. The method of claim 1, further comprising the step of injecting the second permeate into a natural gas reservoir from which the feed gas is ultimately obtained.

3. The method of claim 1, wherein Helium is present in the Helium-containing natural gas at a concentration of less than 0.5 mol %.

4. The method of claim 1, wherein a stream of the second permeate has a mass flow rate of no more than 3% of a mass flow rate of a stream of the Helium-containing natural gas separated at the first gas separation membrane.

5. The method of claim 1, further comprising the step of purifying the second permeate stream to provide a Helium product gas having a Helium concentration of at least 99 mol %.

* * * * *